United States Patent
Okamura

(10) Patent No.: US 7,471,611 B2
(45) Date of Patent: Dec. 30, 2008

(54) ZONE PHASE CORRECTING LENS AND OPTICAL HEAD DEVICE

(75) Inventor: Tetsuro Okamura, Nagano-pref (JP)

(73) Assignee: Nidec Nissin Corporation, Nagano-Pref. (JP)

(*) Notice: Subject to any disclaimer, the term of this patent is extended or adjusted under 35 U.S.C. 154(b) by 645 days.

(21) Appl. No.: 11/149,918

(22) Filed: Jun. 10, 2005

(65) Prior Publication Data
US 2006/0002279 A1 Jan. 5, 2006

(30) Foreign Application Priority Data
Jun. 11, 2004 (JP) ............................. 2004-174496
Apr. 14, 2005 (JP) ............................. 2005-117170

(51) Int. Cl.
*G11B 7/00* (2006.01)

(52) U.S. Cl. .............................. 369/112.08; 369/44.23; 369/112.23

(58) Field of Classification Search ........................ None
See application file for complete search history.

(56) References Cited

U.S. PATENT DOCUMENTS

| | | | |
|---|---|---|---|
| 6,363,037 B1* | 3/2002 | Yamazaki | 369/112.26 |
| 6,999,399 B2* | 2/2006 | Honda | 369/112.08 |
| 7,035,193 B2* | 4/2006 | Takeuchi et al. | 369/112.13 |

FOREIGN PATENT DOCUMENTS

| | | |
|---|---|---|
| JP | 2001-051192 | 2/2001 |
| JP | 2002-215447 | 7/2002 |
| JP | 5518684 | 6/2004 |

* cited by examiner

*Primary Examiner*—Joseph Feild
*Assistant Examiner*—Joseph Haley
(74) *Attorney, Agent, or Firm*—Reed Smith LLP

(57) ABSTRACT

A zone phase correcting lens wherein a change in the third-order spherical aberration or the like is small in the case of a change in temperature and an optical head device having the zone phase correcting lens used as an objective lens. A minus sign is appended to the height measurement of a step formed so as to make the lens thickness in the optical axis thinner toward the outer region and a plus sign is appended to a step formed so as to make the lens thickness thicker toward the outer region. Supposing that D is an absolute value of the sum of the height measurements of the steps having the minus sign on the first surface and the second surface and E is an absolute value of the sum of the height measurements of the steps having the plus sign on the first surface and the second surface, a wavelength $\lambda_1$ and a refractive index $N_1$ of the lens for a first laser beam satisfy the following conditions:

$$10 \times \lambda_1 < \{D \times (N_1-1)\} < 30 \times \lambda_1$$

$$2 \times E < D.$$

5 Claims, 4 Drawing Sheets

Fig 2
(A)
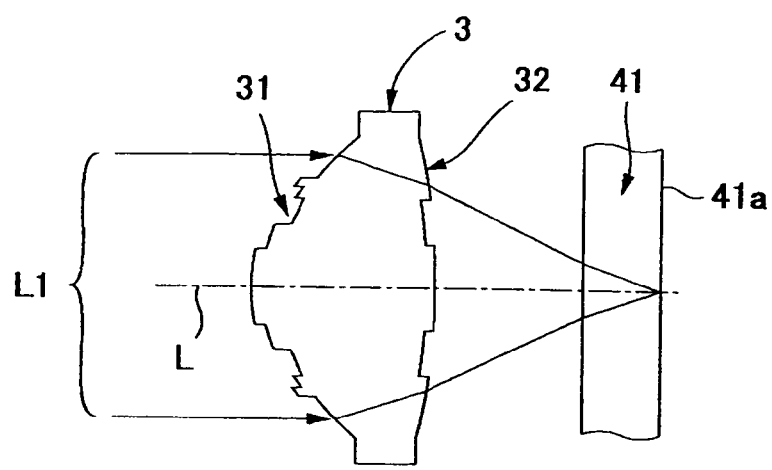
(B)
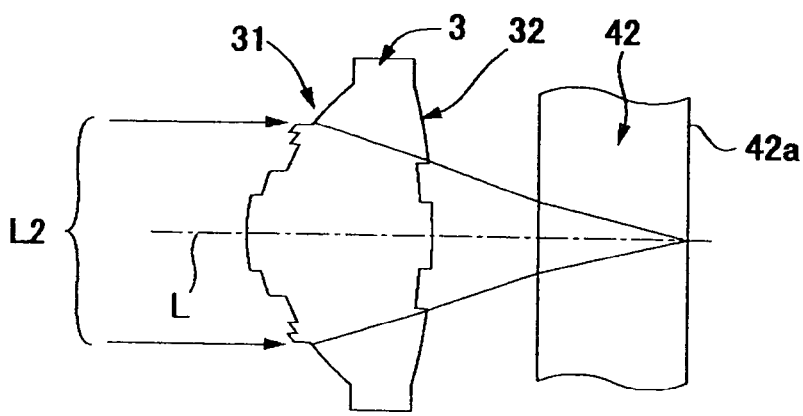

United States Patent US 7,471,611 B2

ZONE PHASE CORRECTING LENS AND OPTICAL HEAD DEVICE

CROSS-REFERENCE TO RELATED APPLICATIONS

This application claims priority of Japanese Application No. 2004-174496, filed Jun. 11, 2004 and Japanese Application No. 2005-117170, filed Apr. 14, 2005, the complete disclosures of which are hereby incorporated by reference.

BACKGROUND OF THE INVENTION

1. Field of the Invention

The present invention relates to a zone phase correcting lens capable of concentrating laser beams different in wavelength on recording layers of optical recording mediums such as a DVD and a CD different in board thickness and to an optical head device having the zone phase correcting lens used as an objective lens.

2. Related Background Art

There are known optical recording mediums different in thickness of a transparent protective layer for protecting a recording surface or different in recording density like a CD, a DVD, and the like. A laser beam having a wavelength of approx. 655 nm is used for playing a DVD and a laser beam having the wavelength of approx. 785 nm is used for playing and recording a CD (including a CD-R). As an optical head device for recording or reproducing information to or from a plurality of types of optical recording mediums, there has been suggested an optical head device, wherein laser beams are concentrated on the recording surfaces of a DVD and a CD by using a common objective lens from the viewpoint of downsizing and lowering the cost. A CD, however, has a transparent protective layer, which is 1.2 mm thick, for protecting the recording surface. On the other hand, a DVD has a transparent protective layer 0.6 mm thick, which is thinner than the CD. Thus, the normal lens cannot suitably concentrate laser beams on the recording surfaces of the CD and the DVD. Therefore, it has been suggested to use a zone phase correcting lens having a plurality of zone refractive surfaces adjacent to each other via an adjacent step on a lens surface and formed so as to correct a phase for each of the zone refractive surfaces, as an objective lens (for example, refer to Laid-Open Japanese Patent Publication (Kokai) Nos. 2001-51192 and 2003-215447 and Japanese Patent Publication No. 3518684).

In designing this type of zone phase correcting lens, generally a lens surface whose wavefront aberration has been corrected in a laser beam having a wavelength $\lambda_1$ for use in a DVD is defined as a reference lens surface. Moreover, the reference lens surface is separated into a plurality of zone refractive surfaces and these refractive surfaces are shifted from the reference lens surface in the optical axis direction. In this regard, as shown in FIG. 4, the height measurement d of an adjacent step formed between the zone refractive surfaces adjacent to each other is defined so as to satisfy the conditions: the product of a vertex step height measurement δ and $(N_1-1)$ is an integral multiple of the wavelength $\lambda_1$, where $N_1$ is the lens refractive index in the laser beam having the wavelength $\lambda_1$, and the aberration of the CD is at a minimum, supposing that the vertex step height measurement δ is a distance between the vertex obtained by extending the zone refractive surface toward the optical axis and the vertex of the innermost surface. Therefore, stepped discontinuous wavefront aberration occurs in a laser beam having a wavelength $\lambda_2$ for use in a CD without deteriorating the wavefront aberration in the laser beam having the wavelength $\lambda_1$ for use in a DVD. Thus, in order to reduce the aberration, the phases of the zone refractive surfaces are corrected so that the aberration is allotted appropriately to the aberration on the DVD side. Thereby, it becomes possible to control the shape of aberration of the laser beam having the wavelength $\lambda_2$.

Conventionally, the step height measurement δ is generally set so as to satisfy the following formulas:

$$|m \times \lambda_1 - \delta \times (N_1-1)| < 0.15 \times \lambda_1$$

$$|n \times \lambda_2 - \delta \times (N_2-1)| < 0.15 \times \lambda_1$$

where
$\lambda_1$=Wavelength of first laser beam for DVD
$\lambda_2$=Wavelength of second laser beam for CD
$N_1$=Refractive index of lens material in first laser beam
$N_2$=Refractive index of lens material in second laser beam
m, n=Integer of 0 to 3, and
δ=Height measurement of vertex step If, however, the conventional configuration is represented using the height measurement d of an adjacent step formed between zone refractive surfaces adjacent to each other, instead of the height measurement δ of the vertex step, the adjacent step height measurement d is low as represented by the following formula:

$$|d \times (N-1)| < 1.3 \times \lambda$$

where
λ=Wavelength of laser beam, and
N=Refractive index of lens material in laser beam having wavelength λ

Thus, the conventional lens is insensitive to wavelength fluctuations. Therefore, it has a problem that, if the wavelength of a laser beam emitted from a semiconductor laser varies due to a temperature change, it is impossible to offset the third-order spherical aberration and the fifth-order spherical aberration effectively.

OBJECTS AND SUMMARY OF THE INVENTION

In view of this problem, the present invention has been provided. Therefore, it is an object of the present invention to provide a zone phase correcting lens comprising a plurality of zone refractive surfaces adjacent to each other via a step on a lens surface, the zone phase correcting lens being formed so as to correct a phase for each zone individually, wherein changes in the third-order aberration and the fifth-order aberration can be reduced even if a change in temperature occurs. It is another object of the present invention to provide an optical head device having the zone phase correcting lens used as an objective lens.

To achieve these objects according to one aspect, there is provided a zone phase correcting lens, comprising a plurality of zone refractive surfaces adjacent to each other via an adjacent step in the optical axis direction on at least one of the first surface and the second surface, the zone phase correcting lens being formed so as to correct a phase for each of the zone refractive surfaces, wherein, supposing that: $\lambda_1$ is the wavelength of a first laser beam incident on the zone phase correcting lens and $\lambda_2$ is the wavelength of a second laser beam having a longer wavelength than the first laser beam; a minus sign is appended to the height measurement of an adjacent step formed so as to make the outer zone refractive surface thinner in lens thickness in the optical axis direction than the inner zone refractive surface and a plus sign is appended to the height measurement of an adjacent step formed so as to make the outer zone refractive surface thicker in lens thickness in the optical axis direction than the inner zone refractive surface; D is an absolute value of the sum of the height measurements of the adjacent steps having the minus sign formed on the first surface, the second surface, or the both surfaces; and E is an absolute value of the sum of the height measurements of the adjacent steps having the plus sign formed on the first surface, the second surface, or the both surfaces, the wavelength $\lambda_1$, the sum D, the sum E, and a refractive index $N_1$ of the zone phase correcting lens for the first laser beam satisfy the following two formulas:

$$10 \times \lambda_1 < \{D \times (N_1-1)\} < 30 \times \lambda_1$$

$$2 \times E < D$$

The present invention is applicable to both cases where a zone refractive surface is formed on both of the first surface and the second surface and where it is formed on only one of the surfaces. Therefore, if the zone refractive surface is formed only on the second surface and not formed on the first surface, for example, D is an absolute value of the sum of the height measurements of the adjacent steps formed on the second surface with a minus sign of the second surface.

In the present invention, the lower limit $(10 \times \lambda_1)/(N_1-1)$ has been set for the sum D of the adjacent step height measurements. Therefore, the adjacent step is large in comparison with the conventional zone phase correcting lens and therefore the zone phase correcting lens of the present invention is sensitive to wavelength fluctuations. Thus, during the use at the wavelength $\lambda_1$, a spherical aberration caused by a temperature variation can be offset by a spherical aberration caused by a wavelength fluctuation. More specifically, if the temperature rises, the wavelength of a laser beam tends to be longer and this change causes the proportion between the wavelength and the adjacent step height measurements to be out of balance and thereby shifts the spherical aberration. However, the rise of the lens temperature causes a spherical aberration in the minus direction and the change in wavelength causes a spherical aberration in the positive direction. Therefore, the change in the spherical aberration can be offset or reduced. Moreover, the upper limit $(30 \times \lambda_1)/(N_1-1)$ has been set for the sum D of the adjacent step height measurements. Therefore, in the case of a change in wavelength caused by a change in temperature, an excess correction does not occur. Accordingly, even if the wavelength changes due to a change in temperature, there are only small changes in the third-order spherical aberration and the fifth-order spherical aberration. Furthermore, the relation $2 \times E < D$ has been set between the sum D and the sum E of the adjacent step height measurements, thereby preventing an occurrence of a high-order aberration.

In the present invention, preferably the wavelength $\lambda_1$, the sum D, and the refractive index $N_1$ satisfy the following formula:

$$12 \times \lambda_1 < \{D \times (N_1-1)\} < 22 \times \lambda_1$$

With this arrangement, along with a wavelength fluctuation, a change in wavefront aberration can be reliably offset by a change in spherical aberration caused by the wavelength fluctuation. Therefore, changes in the third-order spherical aberration and the fifth-order spherical aberration are small.

In the present invention, the number of zone refractive surfaces is, for example, 6 or greater.

The lens according to the present invention is used as an objective lens for an optical head device. In the optical head device, using it in this way, the objective lens is used to concentrate the first laser beam on the recording surface of a first optical recording medium and to concentrate the second laser beam having the wavelength $\lambda_2$ longer than the first laser beam on the recording surface of a second optical recording medium having a transparent protective layer thicker than the transparent protective layer of the first optical recording medium.

In the zone phase correcting lens according to the present invention, the lower limit $(10 \times \lambda_1)/(N_1-1)$ has been set for the sum D of the adjacent step height measurements. Therefore, the adjacent step is large in comparison with the conventional zone phase correcting lens and therefore the zone phase correcting lens of the present invention is sensitive to wavelength fluctuations. More specifically, if the temperature rises, the wavelength of a laser beam tends to be longer and this change causes the proportion between the wavelength and the adjacent step height measurements to be out of balance and thereby shifts the spherical aberration. However, during the use at the wavelength $\lambda_1$, the change in wavelength causes a spherical aberration in the positive direction. Therefore, it can offset or reduce the change in the spherical aberration in the minus direction caused by the change in temperature of the zone phase correcting lens. Moreover, the upper limit $(30 \times \lambda_1)/(N_1-1)$ has been set for the sum D of the adjacent step height measurements. Therefore, in the case of a change in wavelength caused by a change in temperature, an excess correction does not occur. Accordingly, even if the wavelength changes due to a change in temperature, there are only small changes in the third-order spherical aberration and the fifth-order spherical aberration. Furthermore, the relation $2 \times E < D$ has been set between the sum D and the sum E of the adjacent step height measurements, thereby preventing an occurrence of a high-order aberration. If the present invention is used with the wavelength $\lambda_2$, NA is small and therefore a change in aberration caused by the temperature and wavelength fluctuations is small. Therefore, an optical head device having a wide operating temperature range can be achieved.

BRIEF DESCRIPTION OF THE DRAWINGS

The above and other objects, features and advantages of the present invention will become apparent from the following detailed description when taken with the accompanying drawing in which:

FIGS. 2(A) and (B) are an explanatory diagram showing a condition where laser beams concentrate on a recording surface of a DVD via the objective lens and an explanatory diagram showing a condition where laser beams concentrate on a recording surface of a CD via the objective lens;

DETAILED DESCRIPTION OF THE PREFERRED EMBODIMENTS

Figure 4:
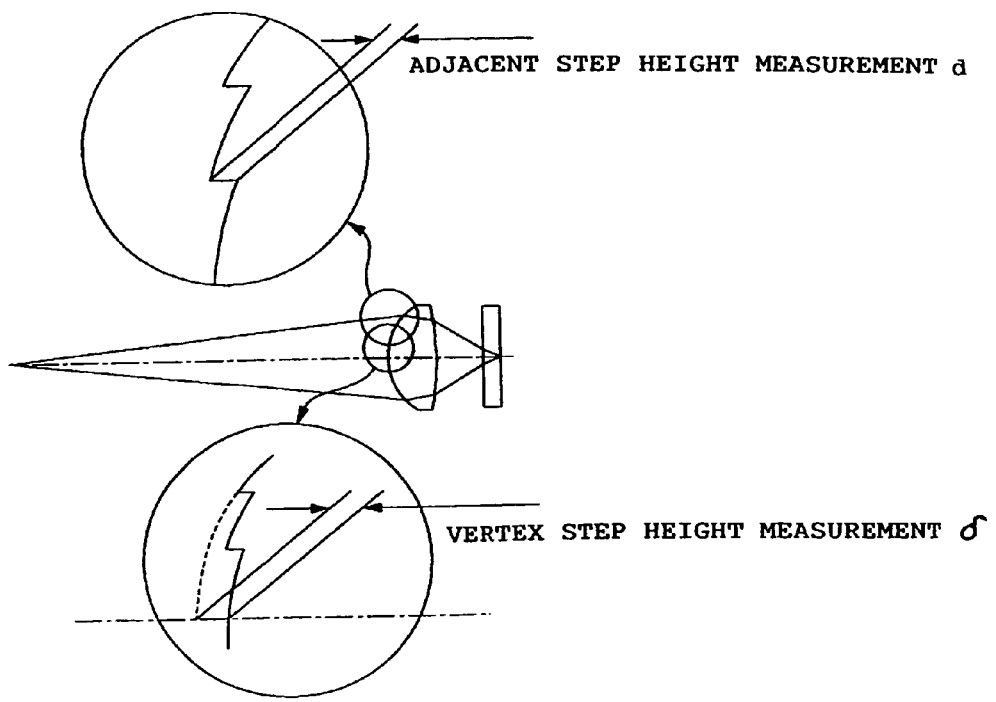
FIG. 4 is an explanatory diagram of an adjacent step and a vertex step formed on the zone phase correcting lens.

An objective lens according to the present invention and an optical head device having the objective lens will be described in detail hereinafter with reference to the accompanying drawings. Regarding the steps in the following description, d is the height measurement of an adjacent step formed between zone refractive surfaces adjacent to each other and δ is the vertex step height measurement, which is a distance between the vertex obtained by extending the zone refractive surface toward the optical axis and the vertex of the innermost surface, as has been described by referring to FIG. 4.

[Configuration of Optical Head Device]

Figure 1:
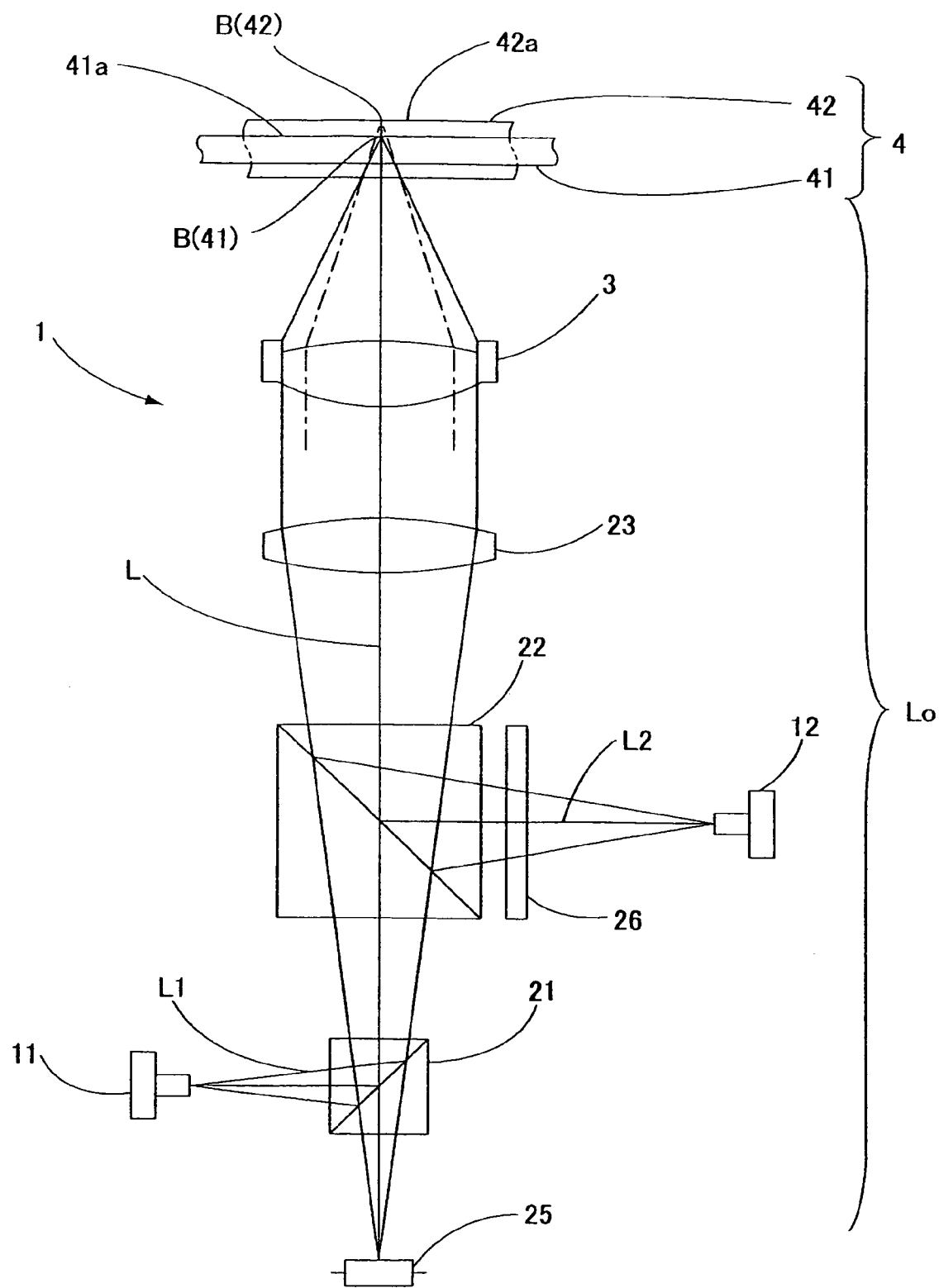
FIG. 1 is a schematic configuration diagram showing an example of an optical system of an optical head device having an objective lens according to the present invention.
Figure 3:
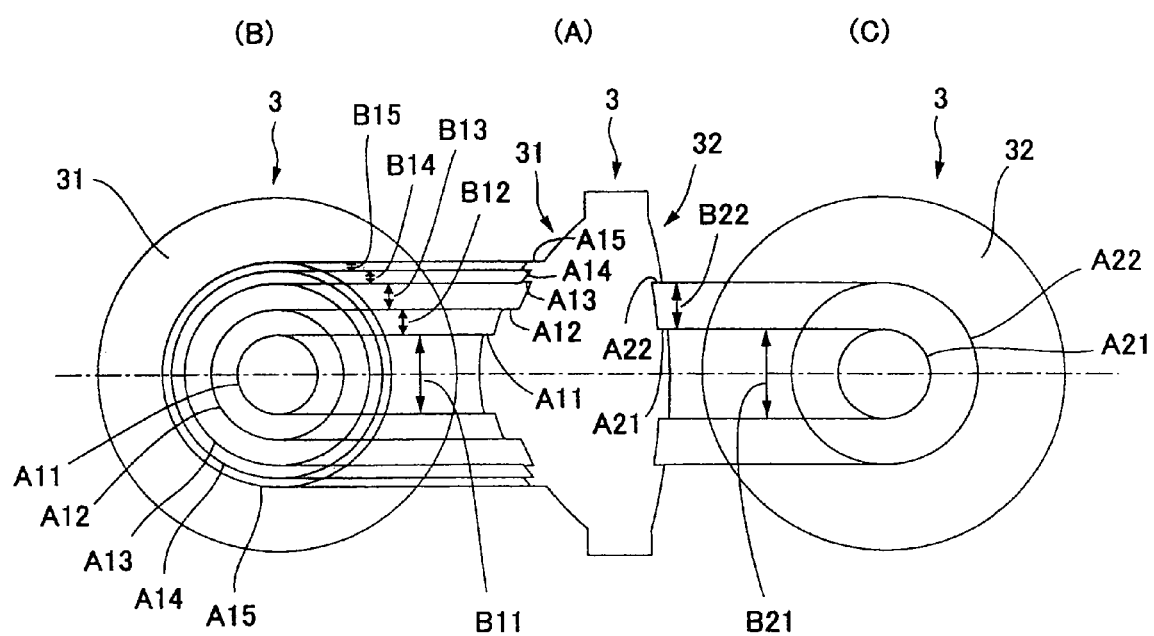
FIGS. 3(A), (B), and (C) are a cross section of the objective lens (zone phase correcting lens) according to the present invention, a plan view of the first surface, and a plan view of the second surface.

Referring to FIG. 1, there is shown a schematic configuration diagram illustrating an example of an optical system of the optical head device having the objective lens according to the present invention. FIGS. 2(A) and (B) illustrate an explanatory diagram showing the state of laser beams concentrating on the recording surface of a DVD via the objective lens and an explanatory diagram showing the state of laser beams concentrating on the recording surface of a CD via the objective lens, respectively. In FIG. 2 and FIG. 3 described later, there is shown an example of the objective lens having the plurality of zone refractive surfaces adjacent to each other via an adjacent step in the optical axis direction on both of the first surface and the second surface and being formed so as to correct a phase for each zone individually. The phase correcting zones, however, may be formed on at least one of the first surface and the second surface.

In FIG. 1, the optical head device 1 according to this embodiment is for use in reproducing or recording information on a plurality of types of optical recording mediums 4 different in board thickness or in recording density such as a DVD, a CD, and a CD-R. It has a first semiconductor laser 11 for emitting a first laser beam L1 having a wavelength of approx. 655 nm for use in playing a DVD and a second semiconductor laser 12 for emitting a second laser beam L2 having a center wavelength of approx. 785 nm for use in recording or playing a CD. The laser beams are guided to the optical recording mediums 4 via a common focusing optical system Lo and optical feedback of the laser beams reflected on the optical recording mediums 4 are guided to a common light receiving element 25.

The focusing optical system Lo includes a beam splitter 21 for reflecting the first laser beam L1 and a beam splitter 22 for reflecting the second laser beam L2 and causing the first laser beam L1 to travel in a straight line, for example. These beam splitters 21 and 22 match the laser beams L1 and L2 with the system optical axis L (the optical axis of the object lens). Along the system optical axis L, there are a collimating lens 23 for paralleling the laser beams L1 and L2 and an objective lens 3 for forming beam spots of the laser beams L1 and L2 output from the collimating lens 23 on the recording surfaces of the optical recording mediums 4. The beam splitters 21 and 22 cause the optical feedback from the optical recording mediums to travel in a straight line and guide it to the common light receiving element 25. A grating 26 for generating three beams is disposed between the second semiconductor laser 12 and the beam splitter 22.

As shown in FIG. 1 and FIGS. 2(A) and (B), in the optical head device 1 according to this embodiment, the beam spot of the first laser beam L1 is formed by the objective lens 3 on a recording surface 41a of a DVD 41 as the first optical recording medium 4. Also on a recording surface 42a of a CD 42 as the second optical recording medium 4, the beam spot of the second laser beam L2 is formed by the objective lens 3.

The first and second laser beams L1 and L2 concentrated on the optical recording mediums 4 (the DVD 41 and the CD 42) in this manner are reflected on the optical recording mediums 4. Thereafter, they provide optical feedback along the common focusing optical system Lo and concentrate on the common light receiving element 25 passing through the beam splitters 22 and 21 in this order. Then, the information on the optical recording mediums 4 (the DVD 41 and the CD 42) is reproduced by means of signals detected in the common light receiving element 25.

In this regard, the CD 42 has a transparent protective layer, which is 1.2 mm thick, for protecting the recording surface, while the DVD 41 has a transparent protective layer 0.6 mm thick that is thinner than the CD 42. Therefore, when a normal lens is used as the objective lens 3, laser beams cannot be favorably concentrated on the recording surfaces 41a and 42a of the DVD 41 and the CD 42, respectively. Thereupon, a zone phase correcting lens described below is used as the objective lens in this embodiment.

[Configuration of Objective Lens]

Referring to FIGS. 3(A), (B), and (C), shown there are a cross section of an objective lens (zone phase correcting lens), a plan view of the first surface, and a plan view of the second surface.

In FIGS. 2(A) and (B) and FIGS. 3(A), (B), and (C), the objective lens 3 is a convex lens having the first surface 31 (refractive surface on the incidence side) with positive power, on which the laser beams L1 and L2 emitted from the first semiconductor laser 11 and the second semiconductor laser 12 are incident, and the second surface 32 (refractive surface on the output side), from which the laser beams are output toward the optical recording mediums 4.

In this embodiment, the objective lens 3 is a zone phase correcting lens, wherein a plurality of zone refractive surfaces B11 and after adjacent to each other are formed via each of adjacent steps A11 and after in the optical axis direction on the first surface 31 and a plurality of zone refractive surfaces B21 and after adjacent to each other are formed via each of adjacent steps A21 and after in the optical axis direction on the second surface 32.

When the objective lens 3 is designed, the reference lens surface is considered to be a lens surface where wavefront aberration is removed in the first laser beam L1 having the wavelength $\lambda_1$ for use in the DVD 41. Moreover, the reference lens surface is separated into the plurality of zone refractive surfaces B11 and after or zone refractive surfaces B21 and after. These refractive surfaces B11 and after or the refractive surfaces B21 and after are then shifted from the reference lens surface in the optical axis direction L. In this regard, the height measurement d for the adjacent steps A11 and after or A21 and after formed between the adjacent zone refractive surfaces B11 and after or B21 and after is determined so as to satisfy the conditions: the product of the height measurement d and ($N_1$−1) is an integral multiple of the wavelength $\lambda_1$, where $N_1$ is the lens refractive index in the laser beam having the wavelength $\lambda_1$, and the aberration of the CD is at a minimum. Therefore, stepped discontinuous wavefront aberration can be generated for the second laser beam L2 having the wavelength $\lambda_2$ for use in the CD 42 without deteriorating the wavefront aberration of the first laser beam L1 having the wavelength $\lambda_1$ for use in the DVD 41. Thus, in order to reduce this aberration, the phases of the zone refractive surfaces B11 and after or B21 and after are corrected so as to allot the aberration appropriately to the aberration of the DVD, thereby enabling a control of the shape of aberration of the second laser beam L2 having the wavelength $\lambda_2$. Accordingly, even if the CD 42 has the transparent protective layer, which is 1.2 mm thick, for protecting the recording surface 42a, while the DVD 41 has the transparent protective layer 0.6 mm thick that is thinner than the CD 42, the laser beams L1 and L2 can be favorably concentrated on the recording surfaces 41a and 42a of the DVD 41 and the CD 42, respectively.

In the example shown in FIG. 2 and FIG. 3, the zone refractive surfaces are formed on both the first surface 31 and the second surface 32. As shown in the embodiment described later, however, zone refractive surfaces may be formed only one of the first surface 31 and the second surface 32. Moreover, FIG. 2 and FIG. 3 show the example in which the six zone refractive surfaces B11 and after adjacent to each other are formed via each of the five adjacent steps A11 and after on the first surface 31 and the three zone refractive surfaces B21 and after adjacent to each other are formed via each of the two adjacent steps A21 and after on the second surface 32. The number of zone refractive surfaces is not limited, however. From the viewpoint of an efficient removal of wavefront aberration, it is preferable that six or more zone refractive surfaces are formed on the first surface 31 and the second surface 32 in total.

Before forming the zone phase correcting lens used as the objective lens 3 in this manner, it is designed so that the steps A11 and after or A21 and after satisfy the conditions below in this embodiment.

First, regarding the steps A11 and after or A21 and after, a minus sign is appended to the height measurement of an adjacent step formed so as to make the outer zone refractive surface thinner in lens thickness in the optical axis direction L than the inner zone refractive surface and a plus sign is appended to the height measurement of an adjacent step formed so as to make the outer zone refractive surface thicker in lens thickness in the optical axis direction L than the inner zone refractive surface. Therefore, the adjacent steps in FIG. 3 are shown as those having the height measurements as follows:

(First surface 31 side)
Adjacent step A11: $-d_{11}$
Adjacent step A12: $-d_{12}$
Adjacent step A13: $+d_{13}$
Adjacent step A14: $+d_{14}$
Adjacent step A15: $-d_{15}$
(Second surface 32 side)
Adjacent step A21: $-d_{21}$
Adjacent step A22: $+d_{22}$ Subsequently, on the first surface 31 or the second surface 32, D is defined as an absolute value of the sum of the height measurements of the adjacent steps each formed so as to make the lens thickness thinner toward the outer region, and E is defined as an absolute value of the sum of the height measurements of the adjacent steps each formed so as to make the lens thickness thicker toward the outer region.

For example, supposing that the adjacent step A11 of the first surface 31 is the innermost step, the sum D and the sum E can be found by the following formulas:

$$D = |d_{11} + d_{12} + d_{15} + d_{21}|$$

$$E = |d_{13} + d_{14} + d_{22}|$$

Then, the height measurements of the adjacent steps are set so that the wavelength $\lambda_1$, the sum D, the sum E, and the refractive index $N_1$ of the lens for the first laser beam satisfy the following two formulas:

$$10 \times \lambda_1 < \{D \times (N_1 - 1)\} < 30 \times \lambda_1$$

$$2 \times E < D$$

In this regard, preferably the wavelength $\lambda_1$, the sum D, and the refractive index $N_1$ for the first laser beam satisfy the following formula:

$$12 \times \lambda_1 < \{D \times (N_1 - 1)\} < 22 \times \lambda_1$$

Moreover, the effect can be confirmed if the change in wavelength of a laser beam relative to the change in temperature is within the following range:

$$0.05 < \Delta\lambda/\Delta t < 0.3 \text{ (nm/}^\circ\text{C.)}$$

In the objective lens 3 (zone phase correcting lens), the lower limit $(10 \times \lambda_1)/(N_1 - 1)$ has been set for the sum D of the adjacent step height measurements as stated above. Thereupon, the adjacent step is large in comparison with the conventional zone phase correcting lens and therefore the zone phase correcting lens of this embodiment is sensitive to wavelength fluctuations. Thus, during the use at the wavelength $\lambda_1$, spherical aberration caused by a change in temperature can be offset or reduced by spherical aberration caused by a change in wavelength. More specifically, if the temperature rises, the wavelengths of the laser beams L1 and L2 tend to be longer and these changes cause the proportion between the wavelengths and the adjacent step height measurements to be out of balance and thereby shift the spherical aberration. However, the change in wavelength causes spherical aberration in the positive direction and thus the change in spherical aberration in the negative direction caused by the change in lens temperature can be offset by the change in spherical aberration caused by the change in wavelength. Moreover, the upper limit $(30 \times \lambda_1)/(N_1 - 1)$ has been set for the sum D of the adjacent step height measurements. Therefore, in the case of a change in wavelength caused by a change in temperature, an excess correction does not occur. Accordingly, even if the wavelength changes due to a change in temperature, there are only small changes in the third-order spherical aberration and the fifth-order spherical aberration. Therefore, the optical head device 1 having the objective lens 3 (zone phase correcting lens) according to the present invention is capable of performing a stable operation in a wide temperature range. Furthermore, the relation $2 \times E < D$ has been set between the sum D and the sum E of the adjacent step height measurements, thereby preventing an occurrence of high-order aberration.

EMBODIMENT

The objective lens 3 (zone phase correcting lens) according to the present invention will now be described below. In the embodiments and comparative examples described below, the lens is designed under the following common conditions:

DVD
$\lambda_1 = 655$ nm
f=3.05
NA=0.6
Lens refractive index $N_1 = 1.5407$
CVD
$\lambda_2 = 785$ nm
f=3.07
NA=0.47
Lens refractive index $N_2 = 1.5371$ Then, comparisons have been made with respect to the third-order spherical aberration $\Delta SA_3$ at room temperature and at the temperature 30 degrees higher than the room temperature at which the wavelength is 5 nm longer during use of a DVD. Moreover, comparisons have been made with the respect to the square root $\Delta SA_{35} = \sqrt{(\Delta SA_3^2 + \Delta SA_5^2)}$ of the sum of squares of the third-order spherical aberration $\Delta SA_3$ and the fifth-order spherical aberration $\Delta SA_5$.

Embodiment 1

$D = 25.51 \lambda_1$
$E = 0.32 \lambda_1$
$D \times (N_1 - 1) = 13.8 \lambda_1$
$E \times (N_1 - 1) = 0.2 \lambda_1$ At room temperature
ΔSA$_3$=+0.0016λ rms, ΔSA$_{35}$=0.0019λ rms
At temperature 30 degrees higher than room temperature
ΔSA$_3$=−0.0124λ rms, ΔSA$_{35}$=0.0149λ rms Embodiment 2

D=37.73λ$_1$
E=12.61λ$_1$
D×(N$_1$−1)=20.4λ$_1$
E×(N$_1$−1)=6.8λ$_1$
At room temperature
ΔSA$_3$=−0.0011λ rms, ΔSA$_{35}$=0.0024λ rms
At temperature 30 degrees higher than room temperature
ΔSA$_3$=−0.0064λ rms, ΔSA$_{35}$=0.0083λ rms

COMPARATIVE EXAMPLE 1

D=11.73λ$_1$
E=7.04λ$_1$
D×(N$_1$−1)=6.3λ$_1$
E×(N$_1$−1)=3.8λ$_1$
At room temperature
ΔSA$_3$=+0.0015λ rms, ΔSA$_{35}$=0.0050λ rms
At temperature 30 degrees higher than room temperature
ΔSA$_3$=−0.0170λ rms, ΔSA$_{35}$=0.0234λ rms

COMPARATIVE EXAMPLE 2

D=63.85λ$_1$
E=35.34λ$_1$
D×(N$_1$−1)=34.5λ$_1$
E×(N$_1$−1)=19.1λ$_1$
At room temperature
ΔSA$_3$=−0.0006λ rms, ΔSA$_{35}$=0.0023λ rms
At temperature 30 degrees higher than room temperature
ΔSA$_3$=−0.0110λ rms, ΔSA$_{35}$=0.0037λ rms
In this example, the effect of correcting the third-order spherical aberration remains, but large high-order aberration occurs.

[Comparison Result]

Thus, in the objective lens 3 according to the embodiments 1 and 2 of the present invention, the change in temperature causes only a small change in the third-order spherical aberration ΔSA$_3$ and a small change in the square root ΔSA$_{35}$=√(ΔSA$_3^2$+ΔSA$_5^2$) of the sum of squares of the third-order spherical aberration ΔSA$_3$ and the fifth-order spherical aberration ΔSA$_5$.

[Lens Design Data]

The lens design data of the embodiments 1 and 2 and the comparative examples 1 and 2 are as described below. In the following data, a step on the first surface is indicated by a distance (the vertex step height measurement δ) between the position where the first surface extended toward the optical axis intersects the optical axis and the position where the innermost refractive surface intersects the optical axis, and a step on the second surface is indicated by a distance (the vertex step height measurement δ) between the position where the second surface extended toward the optical axis intersects the optical axis and the position where the innermost refractive surface intersects the optical axis. The shape of an aspherical surface Z(r) of the lens surface has rotational symmetry and is represented about a radius coordinate r by the following formula:

$$Z(r) = cr^2 / [1 + \{1 - (1+k)c^2 r^2\}^{1/2}] + A_2 \cdot r^2 + A_4 \cdot r^4 + A_6 \cdot r^6 + \ldots$$

where c is the inverse of a curvature radius R, k is a conic constant, A2, A4, and A6 are second-, fourth-, and sixth-order aspherical surface coefficients, respectively. In a representation of an aspherical surface coefficient or the like, E and a subsequent numeric n means 1×10$^n$. In the data shown below, a step is indicated by a vertex step height measurement δ and respective zone data are described in order of increasing proximity to the outermost region from the innermost region. The outside diameter of a zone is indicative of the outer step position of the zone through a distance from the optical axis.

Embodiment 1

Spacing: 1.75000
First surface
Outside diameter=0.40000
Vertex step height measurement δ=0.00000
R=1.9409
k=0.000000E+00
A$_4$=−0.103627E−01
Adjacent step height measurement d=−0.000134
Outside diameter=0.60000
Vertex step height measurement δ=0.00113
R=1.92920
k=0.000000E−01
A$_4$=−0.125417E−01
Adjacent step height measurement d=−0.000878
Outside diameter=0.85000
Vertex step height measurement δ=0.00953
R=1.92316
k=0.000000E+00
A$_4$=−0.122319E−01
Adjacent step height measurement d=−0.00139
Outside diameter=1.00000
Vertex step height measurement δ=0.01112
R=1.93640
k=−0.570271E+00
A$_4$=0.162491E−02
Adjacent step height measurement d=0.00003
Outside diameter=1.30000
Vertex step height measurement δ=0.01030
R=1.94652
k=0.681358E−02
A$_4$=−0.332210E−02
A$_6$=−0.488377E−02
Adjacent step height measurement d=−0.00520
Outside diameter=1.43900
Vertex step height measurement δ=0.05428
R=2.48307
k=−0.163936E−02
A$_4$=0.294890E−01
A$_6$=−0.522167E−02
Adjacent step height measurement d=0.00018
Outside diameter=1.83000
Vertex step height measurement δ=0.01685
R=1.96153
k=−0.658542E+00
A$_4$=0.673843E−02
A$_6$=−0.766141E−03
Second surface
R=−7.46182
k=0.33121E+01
A$_4$=0.210543E−01
A$_6$=−0.661806E−02
A$_8$=0.124308E−02
A$_{10}$=−0.899029E−04

Embodiment 2

Spacing: 1.75000
First surface
Outside diameter=0.40000
Vertex step height measurement δ=0.00000
R=1.94109
k=0.000000E+00
$A_4$=−0.115334E−01
Adjacent step height measurement d=−0.00136
Outside diameter=0.60000
Vertex step height measurement δ=0.00101
R=1.92168
k=0.000000E+00
$A_4$=−0.149837E−01
Adjacent step height measurement d=−0.00880
Outside diameter=0.85000
Vertex step height measurement δ=0.00939
R=1.91953
k=0.000000E+00
$A_4$=−0.127778E−01
Adjacent step height measurement d=−0.00136
Outside diameter=1.00000
Vertex step height measurement δ=0.00890
R=1.89958
k=−0.786108E+00
$A_4$=0.261570E−02
Adjacent step height measurement d=−0.00008
Outside diameter=1.30000
Vertex step height measurement δ=0.01629
R=2.04682
k=−0.386395E−02
$A_4$=0.734618E−02
$A_6$=−0.566590E−02
Adjacent step height measurement d=−0.01311
Outside diameter=1.43900
Vertex step height measurement δ=0.05144
R=2.37308
k=0.297659E−03
$A_4$=0.275106E−01
$A_6$=−0.604643E−02
Adjacent step height measurement d=0.00826
Outside diameter=1.83000
Vertex step height measurement δ=0.01672
R=1.96068
k=−0.657277E+00
$A_4$=0.667357E−02
$A_6$=−0.765798E−03
Second surface
R=−7.46182
k=0.33121E+01
$A_4$=0.210543E−01
$A_6$=−0.661806E−02
$A_8$=0.124308E−02
$A_{10}$=−0.899029E−04

COMPARATIVE EXAMPLE 1

Spacing: 2.25000
First surface
R=1.40023
k=−0.10524E+01
$A_2$=−0.123686E+00
$A_4$=0.100045E−01
$A_6$=0.765656E−03
Second surface
Outside diameter=0.29000
Vertex step height measurement δ=0.00000
R=−3.84781
k=−0.100000E+02
$A_2$=0.605859E−01
$A_4$=0.639728E−02
$A_6$=−0.115456E−02
Adjacent step height measurement d=−0.00120
Outside diameter=0.38000
Vertex step height measurement δ=−0.00121
R=−3.85072
k=−0.100000E+02
$A_2$=0.606227E−01
$A_4$=0.638265E−02
$A_6$=−0.115159E−02
Adjacent step height measurement d=−0.00144
Outside diameter=0.48300
Vertex step height measurement δ=−0.00267
R=−3.84987
k=−0.100000E+02
$A_2$=0.608028E−01
$A_4$=0.632621E−02
$A_6$=−0.114289E−02
Adjacent step height measurement d=−0.00119
Outside diameter=0.57600
Vertex step height measurement δ=−0.00389
R=−3.85120
k=−0.100000E+02
$A_2$=0.608893E−01
$A_4$=0.629708E−02
$A_6$=−0.113798E−02
Adjacent step height measurement d=−0.00142
Outside diameter=0.70600
Vertex step height measurement δ=−0.00535
R=−3.85086
k=−0.100000E+02
$A_2$=0.610528E−01
$A_4$=0.624558E−02
$A_6$=−0.112993E−02
Adjacent step height measurement d=−0.00116
Outside diameter=1.07300
Vertex step height measurement δ=−0.00656
R=−3.84992
k=−0.100000E+02
$A_2$=0.612063E−01
$A_4$=0.619929E−02
$A_6$=−0.112300E−02
Adjacent step height measurement d=0.00133
Outside diameter=1.13300
Vertex step height measurement δ=−0.00510
R=−3.85012
k=−0.100000E+02
$A_2$=0.610473E−01
$A_4$=0.624956E−02
$A_6$=−0.113090E−02
Adjacent step height measurement d=0.00110
Outside diameter=1.22300
Vertex step height measurement δ=−0.00389
R=−3.85120
k=−0.100000E+02
$A_2$=0.608893E−01
$A_4$=0.629708E−02
$A_6$=−0.113798E−02
Adjacent step height measurement d=0.00110
Outside diameter=1.27300
Vertex step height measurement δ=−0.00267
R=−3.84987
k=−0.100000E+02

$A_2=0.608028E-01$
$A_4=0.632621E-02$
$A_6=-0.114289E-02$
Adjacent step height measurement d=0.00108
Outside diameter=1.49200
Vertex step height measurement δ=−0.00146
R=−3.85298
k=−0.100000E+02
$A_2=0.605761E-01$
$A_4=0.639482E-02$
$A_6=-0.115293E-02$
Adjacent step height measurement d=−0.00127
Outside diameter=1.74600
Vertex step height measurement δ=−0.00292
R=−3.85377
k=−0.100000E+02
$A_2=0.607011E-01$
$A_4=0.635803E-02$
$A_6=-0.114742E-02$

COMPARATIVE EXAMPLE 2

Spacing: 1.75000
First surface
Outside diameter=0.40000
Vertex step height measurement δ=0.00000
R=1.94109
k=0.000000E+00
$A_4=-0.893898E-02$
Adjacent step height measurement d=−0.00867
Outside diameter=0.60000
Vertex step height measurement δ=0.00843
R=1.92728
k=0.000000E+00
$A_4=-0.119869E-01$
Adjacent step height measurement d=−0.01620
Outside diameter=0.80000
Vertex step height measurement δ=0.02470
R=1.93631
k=0.000000E+00
$A_4=-0.896096E-02$
Adjacent step height measurement d=−0.00887
Outside diameter=0.90000
Vertex step height measurement δ=0.02897
R=1.84122
k=−0.124453E+00
$A_4=-0.188936E-01$
Adjacent step height measurement d=0.01370
Outside diameter=1.35000
Vertex step height measurement δ=0.02416
R=2.03019
k=0.426396E-01
$A_4=0.553182E-02$
$A_6=-0.563312E-02$
Adjacent step height measurement d=0.00945
Outside diameter=1.43900
Vertex step height measurement δ=0.03709
R=2.28792
k=−0.248465E-03
$A_4=0.198728E-01$
$A_6=-0.449486E-02$
Adjacent step height measurement d=−0.00808
Outside diameter=1.83000
Vertex step height measurement δ=0.02192
R=1.98533
k=−0.657678E+00
$A_4=0.818951E-02$
$A_6=-0.535316E-03$
Second surface
R=−7.46182 k=0.50816E+01
$A_4=0.216856E-01$
$A_6=-0.476334E-02$
$A_8=0.492855E-03$
$A_{10}=0.759487E-05$

Other Embodiments

Besides the above embodiments, simulations have been performed under different conditions. As a result, it has been confirmed that the problem of aberration caused by a change in temperature can be resolved if adjacent step height measurements are set so that the wavelength $\lambda_1$, the sum D, the sum E, and the refractive index $N_1$ of the lens for the first laser beam satisfy the following two formulas:

$$10\times\lambda_1 < \{D\times(N_1-1)\} < 30\times\lambda_1$$

$$2\times\{E\times(N_1-1)\} < \{D\times(N_1-1)\}$$

Moreover, it has been confirmed that the problem of aberration caused by a change in temperature can be resolved more reliably if the wavelength $\lambda_1$, the sum D, the sum E, and the refractive index $N_1$ of the lens for the first laser beam satisfy the following formula:

$$12\times\lambda_1 < \{D\times(N_1-1)\} < 22\times\lambda_1$$

Furthermore, the effect has been confirmed if the change in wavelength of the laser beam relative to the change in temperature is within the following range:

$$0.05 < \Delta\lambda/\Delta t < 0.3 \text{ (nm/}°\text{C.)}$$

The above embodiments have been made with the description of the DVD 41 using the laser beam having the wavelength of approx. 655 nm and the CD 42 using the laser beam having the wavelength of approx. 785 nm. The present invention, however, is also applicable to a case of using a Blue-ray (TM) disc, which uses a laser beam having the wavelength of approx. 405 nm and has a surface protective layer of 0.1 mm thinner than those.

While the foregoing description and drawings represent the present invention, it will be obvious to those skilled in the art that various changes may be made therein without departing from the true spirit ad scope of the invention.

What is claimed is:
1. A zone phase correcting lens, comprising:
a plurality of zone refractive surfaces adjacent to each other via an adjacent step in the optical axis direction on at least one of the first surface and the second surface;
said zone phase correcting lens being formed so as to correct a phase for each of the zone refractive surfaces; wherein,
supposing that:
$\lambda_1$ is the wavelength of a first laser beam incident on the zone phase correcting lens and $\lambda_2$ is the wavelength of a second laser beam having a longer wavelength than the first laser beam;
a minus sign is appended to a height measurement of an adjacent step formed so as to make an outer zone refractive surface thinner in lens thickness in the optical axis direction than an inner zone refractive surface and a plus sign is appended to the height measurement of an adjacent step formed so as to make the outer zone refractive surface thicker in lens thickness in the optical axis direction than the inner zone refractive surface;
D is an absolute value of the sum of the height measurements of the adjacent steps having the minus sign formed on the first surface, the second surface, or the both surfaces; and

E is an absolute value of the sum of the height measurements of the adjacent steps having the plus sign formed on the first surface, the second surface, or the both surfaces;

then, the wavelength $\lambda_1$, the sum D, the sum E, and a refractive index $N_1$ of the zone phase correcting lens for the first laser beam satisfy the following relationships:

$$10 \times \lambda_1 < \{D \times (N_1-1)\} < 30 \times \lambda_1$$

$$2 \times E < D.$$

2. The zone phase correcting lens according to claim 1, wherein the wavelength $\lambda_1$, the sum D, and the refractive index N1 satisfy the relationship:

$$12 \times \lambda_1 < \{D \times (N_1-1)\} < 22 \times \lambda_1.$$

3. The zone phase correcting lens according to claim 1, wherein the number of zone refractive surfaces is 6 or greater.

4. The zone phase correcting lens according to claim 2, wherein the number of zone refractive surfaces is 6 or greater.

5. An optical head device, wherein a zone phase correcting lens as defined in claim 1 is used as an objective lens; and wherein the objective lens is used to concentrate a first laser beam on a recording surface of a first optical recording medium and to concentrate a second laser beam having a wavelength $\lambda_2$ longer than the first laser beam on a recording surface of a second optical recording medium having a transparent protective layer thicker than a transparent protective layer of the first optical recording medium.

* * * * *